United States Patent
Moseke

(10) Patent No.: US 10,644,436 B2
(45) Date of Patent: May 5, 2020

(54) CHARGING PLUG WITH SEALING ELEMENT

(71) Applicant: Phoenix Contact E-Mobility GmbH, Schieder-Schwalenberg (DE)

(72) Inventor: Dirk Moseke, Hoexter-Luechtringen (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 93 days.

(21) Appl. No.: 15/546,669

(22) PCT Filed: Nov. 17, 2015

(86) PCT No.: PCT/EP2015/076830
§ 371 (c)(1),
(2) Date: Jul. 27, 2017

(87) PCT Pub. No.: WO2016/119941
PCT Pub. Date: Aug. 4, 2016

(65) Prior Publication Data
US 2018/0019536 A1    Jan. 18, 2018

(30) Foreign Application Priority Data

Jan. 29, 2015  (DE) .................. 10 2015 101 265

(51) Int. Cl.
*H01R 13/02*       (2006.01)
*H01R 13/52*       (2006.01)
(Continued)

(52) U.S. Cl.
CPC .......... *H01R 13/5219* (2013.01); *B60L 53/16* (2019.02); *H01R 13/6275* (2013.01);
(Continued)

(58) Field of Classification Search
CPC .......................... H01R 13/5219; H01R 13/639
(Continued)

(56) References Cited

U.S. PATENT DOCUMENTS

2007/0197074 A1    8/2007  Gimbel et al.
2009/0111313 A1*   4/2009  Nagamine ............ H01R 13/533
                                                                     439/358
(Continued)

FOREIGN PATENT DOCUMENTS

DE    102012100235 A1    7/2013
DE    102014116810 A1    5/2016
(Continued)

*Primary Examiner* — Abdullah A Riyami
*Assistant Examiner* — Nader J Alhawamdeh
(74) *Attorney, Agent, or Firm* — Leydig, Voit & Mayer, Ltd.

(57) ABSTRACT

A plug includes: a housing; a locking element that is pivotally mounted on the housing and by which the plug can be fixed to a mating plug; and a sealing element arranged between the locking element and the housing, the sealing element comprising a first fixing region for fixing the sealing element to the locking element, a second fixing region for fixing the sealing element to the housing, and, between the first fixing region and the second fixing region, an elastically deformable connecting region, by which the first fixing region is movable relative to the second fixing region during a pivot movement of the locking element.

6 Claims, 2 Drawing Sheets

(51) Int. Cl.
  *H01R 13/627* (2006.01)
  *B60L 53/16* (2019.01)
  *H01R 13/639* (2006.01)
  *F16L 33/18* (2006.01)
  *F16L 37/12* (2006.01)
(52) U.S. Cl.
  CPC ............ *H01R 13/639* (2013.01); *F16L 33/18* (2013.01); *F16L 37/12* (2013.01); *Y02T 10/7005* (2013.01); *Y02T 10/7072* (2013.01); *Y02T 90/14* (2013.01)
(58) Field of Classification Search
  USPC .................................................. 439/188, 660
  See application file for complete search history.

(56) References Cited

U.S. PATENT DOCUMENTS

| | | |
|---|---|---|
| 2012/0064755 A1 | 3/2012 | Ichio et al. |
| 2012/0171887 A1 | 7/2012 | Sebald et al. |
| 2013/0157485 A1 | 6/2013 | Yamamaru et al. |
| 2014/0106586 A1* | 4/2014 | Boeck ..................... B60L 53/16 439/188 |
| 2014/0113479 A1* | 4/2014 | Yoon .................. H01R 13/4367 439/372 |
| 2014/0357113 A1 | 12/2014 | Fehler et al. |
| 2014/0377986 A1 | 12/2014 | Endo et al. |
| 2016/0006163 A1 | 1/2016 | Tashiro et al. |
| 2018/0019536 A1* | 1/2018 | Moseke ............. H01R 13/5219 |

FOREIGN PATENT DOCUMENTS

| | | |
|---|---|---|
| JP | 2013145706 A | 7/2013 |
| JP | 2014179192 A | 9/2014 |
| WO | WO 2005101583 A1 | 10/2005 |

* cited by examiner

CHARGING PLUG WITH SEALING ELEMENT

CROSS-REFERENCE TO PRIOR APPLICATIONS

This application is a U.S. National Phase application under 35 U.S.C. § 371 of International Application No. PCT/EP2015/076830, filed on Nov. 17, 2015, and claims benefit to German Patent Application No. DE 10 2015 101 265.0, filed on Jan. 29, 2015. The International Application was published in German on Aug. 4, 2016 as WO 2016/119941 A1 under PCT Article 21(2).

FIELD

The invention relates to a plug, in particular to a charging plug.

BACKGROUND

Plugs, in particular charging plugs for charging electric vehicles that are connected via a cable to a charging station, conventionally comprise a locking element by means of which the plug is connectable or fixable to a mating plug, which may be arranged on the vehicle side or on a charging station. The locking element is preferably in the form of a lever. When the plug is plugged in, the locking element is opened and automatically latches into a mating contour of the mating plug. The latched-in locking element is conventionally released by applying pressure to the rear end, remote from the plugging face, of the locking element, making it possible to lever the front end of the locking element, on which a latch hook for latching the locking element onto the mating plug is formed, counter to the pressure of a spring, in such a way that the locking element can be released from the latching thereof and thus the entire plug can be removed or withdrawn from the mating plug.

In plugs known thus far, the locking element is generally fully mounted in the housing of the plug, in such a way that the locking element, apart from the front end of the locking element comprising the latch hook and apart from an operating point on the rear end of the locking element, is fully enclosed on all the side faces thereof by the housing, in such a way that the locking element is covered by the housing. As a result, however, the plug is of an undesirably large size.

Plugs are further known in which the locking element is not integrated into the housing of the plug, but instead the locking element is arranged so as to be exposed on the upper face of the housing of the plug. However, locking elements arranged in this manner generally have insufficient protection against adverse environmental influences, such as dirt and/or water, which may freeze at low ambient temperatures. If dirt and/or water penetrate into a joining gap between the locking element and the housing, the functionality of the locking element may be impeded. If the water located in the joining gap freezes, a pivot movement of the locking element is no longer possible, and so the plug can no longer be released from the mating plug.

SUMMARY

In an embodiment, the present invention provides a plug, comprising: a housing; a locking element that is pivotally mounted on the housing and by which the plug is configured to be fixed to a mating plug; and a sealing element arranged between the locking element and the housing, the sealing element comprising a first fixing region configured to fix the sealing element to the locking element, a second fixing region configured to fix the sealing element to the housing, and, between the first fixing region and the second fixing region, an elastically deformable connecting region, by which the first fixing region is movable relative to the second fixing region during a pivot movement of the locking element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
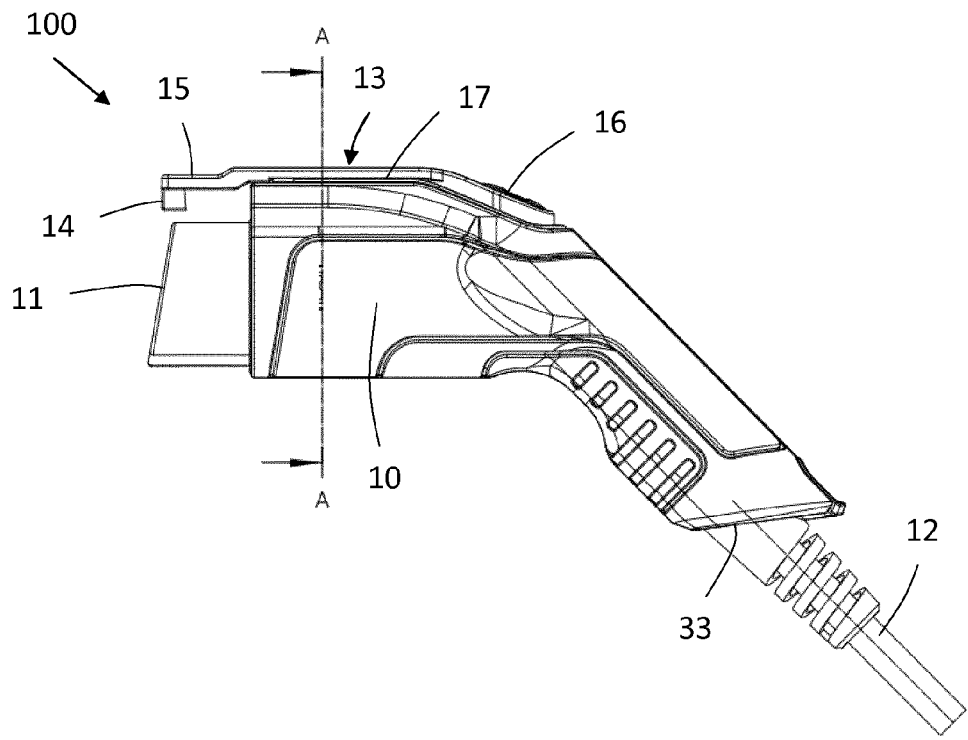
FIG. 1 is a schematic drawing of a plug according to the invention.

The plug according to the invention comprises a housing, a locking element that is pivotally mounted on the housing and by means of which the plug can be fixed to a mating plug, and a sealing element arranged between the locking element and the housing, the sealing element comprising a first fixing region for fixing the sealing element to the locking element and a second fixing region for fixing the sealing element to the housing, the sealing element comprising, between the first fixing region and the second fixing region, an elastically deformable connecting region, by means of which the first fixing region is movable relative to the second fixing region during a pivot movement of the locking element.

The plug according to the invention further comprises a sealing element between the locking element and the housing, this sealing element preferably being arranged within a joining gap formed between the locking element and the housing. The sealing element is thus preferably arranged in a region of the plug in which the locking element is arranged so as to be adjacent to the housing. By means of the sealing element, penetration of dirt and/or water between the sealing element and the housing can be prevented, and therefore the locking element can also be prevented from freezing in place as a result of water frozen between the locking element and the housing. The plug is thus protected against adverse environmental influences, and therefore the functionality of the plug can be ensured at any time. The plug thus has a high functional reliability, in particular as regards locking the plug to a mating plug and also as regards releasing the plug from the mating plug.

The sealing element is formed in such a way that it is fixed both to the housing and to the locking element. For this purpose, the sealing element comprises both a fixing region formed toward the housing and a fixing region formed toward the locking element. Since the sealing element is formed between the housing and the locking element, the two fixing regions are preferably arranged opposite one another.

Despite the secure fixing of the sealing element both to the housing and to the locking element, so as to be able to ensure a high degree of flexibility of the sealing element when the locking element is pivoted into a locked position and into a released position, the sealing element comprises an elastically deformable connecting region between the two fixing regions. As a result of this elastically deformable connecting region, the two fixing regions can be moved relative to one another when the locking element pivots. The sealing element can thus follow the pivot movement of the locking element without losing the sealing effect thereof, in such a way that the sealing element does not obstruct the freedom of movement of the locking element, but instead can follow the movement of the locking element and simultaneously ensure a constant sealing effect.

The sealing element is preferably arranged on side faces of the locking element, which are transverse to the upper and lower face of the locking element and positioned opposite a wall of the housing, in such a way that in particular the upper face of the locking element is exposed for actuating the locking element. The sealing element is preferably arranged peripherally around the locking element, in particular peripherally along the side faces of the locking element, which are arranged so as to be adjacent to a wall of the housing, in such a way that there is no longer direct contact between the housing and the locking element, but merely contact between the locking element and the sealing element and between the sealing element and the housing. However, the sealing element preferably does not extend over the entire length of the locking element, but merely over a partial length of the locking element, where the side faces of the locking element are positioned directly opposite a wall of the housing. The front end of the locking element, which protrudes beyond the housing and on which the latch hook is arranged, is free from the sealing element; in other words, the sealing element is no longer arranged here. As a result of a peripheral arrangement of the sealing element along the outer peripheral face of the sealing element, the locking element may be sealed off toward the housing on all sides by means of the sealing element.

So as to be able to have good movability of the sealing element in the elastically deformable connecting region thereof, it is preferably provided that the connecting region of the sealing element is U-shaped. As a result of the U-shape of the connecting region, during a pivot movement of the locking element, the sealing element can perform a rolling movement in the region of the connecting region thereof, in such a way that particularly good relative movability can be provided between the two fixing regions of the sealing element. The flexibility of the sealing element in the region of the connecting region can thus be increased by the U-shaped design.

In order to fix the sealing element to the locking element, it is preferably provided that the first fixing region comprises at least one ridge that engages in a receiving groove formed in the locking element. As a result of a ridge being formed on the fixing region and said ridge engaging in a receiving groove in the locking element, a form-fitting connection between the sealing element and the locking element can be formed. The first fixing region and thus the at least one ridge of the first fixing region preferably extends over the entire inner peripheral face, facing toward the locking element, of the sealing element. The fixing region may also comprise more than one ridge, in such a way that if two or more ridges are arranged, said ridges preferably being arranged on top of one another on the sealing element, in particular on the inner peripheral face of the sealing element, the fixing of the sealing element to the locking element can be designed to be particularly reliable. If there are two or more ridges of the first fixing region, two or more receiving grooves are also formed in the locking element, the number of receiving grooves corresponding to the number of ridges, since there is preferably a receiving groove associated with each ridge. Further, it is also possible for the ridge and the receiving groove to be formed the other way around, in that at least one receiving groove is formed in the sealing element as a first fixing region and at least one ridge is formed on the locking element, in such a way that a ridge formed on the locking element can engage in a receiving groove formed in the sealing element.

In order to fix the sealing element to the housing, it may also preferably be provided that the second fixing region comprises at least one ridge that engages in a receiving groove formed in the housing. The second fixing region and thus the at least one ridge of the second fixing region preferably extend over the entire outer peripheral face, facing toward the housing, of the sealing element. In this case too, as a result of the sealing element being connected to the housing via a ridge that engages in a receiving groove, a form-fitting connection between the sealing element and the housing can be formed. In addition, in this case too it may be provided that the ridge and the receiving groove are formed the other way around, in that at least one receiving groove is formed in the sealing element as a second fixing region and at least one ridge is formed on the housing, in such a way that at least one ridge of the housing can engage in a receiving groove in the second fixing region of the sealing element so as to be able to form a form-fitting connection between the sealing element and the housing.

Particularly preferably, in this context it is provided that the second fixing region comprises a first ridge and a second ridge arranged below the first ridge, the first ridge engaging in a first receiving groove formed in the housing and the second ridge engaging in a second receiving groove formed in the housing. As a result, particularly reliable fixing of the sealing element to the housing can be provided, in such a way that release of the sealing element from the housing and/or the locking element during a movement of the locking element can be particularly reliably prevented. In this case too, formation the other way around is possible, in that a first ridge and a second ridge arranged below the first ridge are arranged on the housing and the second fixing region comprises a second receiving groove, the ridges formed on the housing in this case each engaging in a receiving groove in the second fixing region of the sealing element.

So as to be able to particularly reliably ensure freedom of movement of the locking element for performing the pivot movement thereof, it is preferably provided that the sealing element is arranged on the locking element so as to be spaced apart from a bearing axle formed on the locking element. The bearing axle of the locking element, which is preferably rotatably mounted inside the housing, is thus arranged below the sealing element, and therefore the bearing axle can also be protected from adverse environmental effects, such as dirt and/or water, by the sealing element. In addition, as a result of the sealing element being arranged so as to be spaced apart from the bearing axle of the locking element, the flexibility of the sealing element when the sealing element follows the movement of the locking element can be reliably ensured.

The use of the above-disclosed plug is preferably provided for charging an electric vehicle.

FIG. 1 shows a plug 100, which is suitable in particular for charging an electric vehicle. The plug 100 comprises a housing 10, on one end of which a plugging face 11 is formed, on which a plurality of contact elements are arranged. Via the plugging face 11, the plug 100 can be electrically conductively brought into contact with a mating plug, which may be arranged on the vehicle side or on a charging station. On an end of the plug 100 opposite the plugging face 11, the housing 10 of the plug 100 comprises an insertion opening 33 for inserting a cable 12 into the plug 100.

The plug 100 further comprises a locking element 13 pivotally mounted on the housing 10. By means of the locking element 13, the plug 100 can be fixed, in particular locked, to the mating plug. The locking element 13 is in the form of a lever, and comprises, on the front end 15 thereof that protrudes beyond the housing 10, a latch hook 14 for latching behind the mating plug. On the rear end 16, positioned opposite the latch hook 14, of the locking element 13, the locking element 13 can be actuated by a user by applying a compressive force so as to pivot the locking element 13 in such a way that the locking element 13 latches onto or is released from a mating plug by means of the latch hook 14. The locking element 13 is arranged on an upper face of the plug 100 in that the locking element 13 is inserted into a recess formed in the housing 10 in such a way that the locking element 13 forms part of an outer face of the plug connector 100. The locking element 13 is thus not covered by the housing 10.

Figure 4:
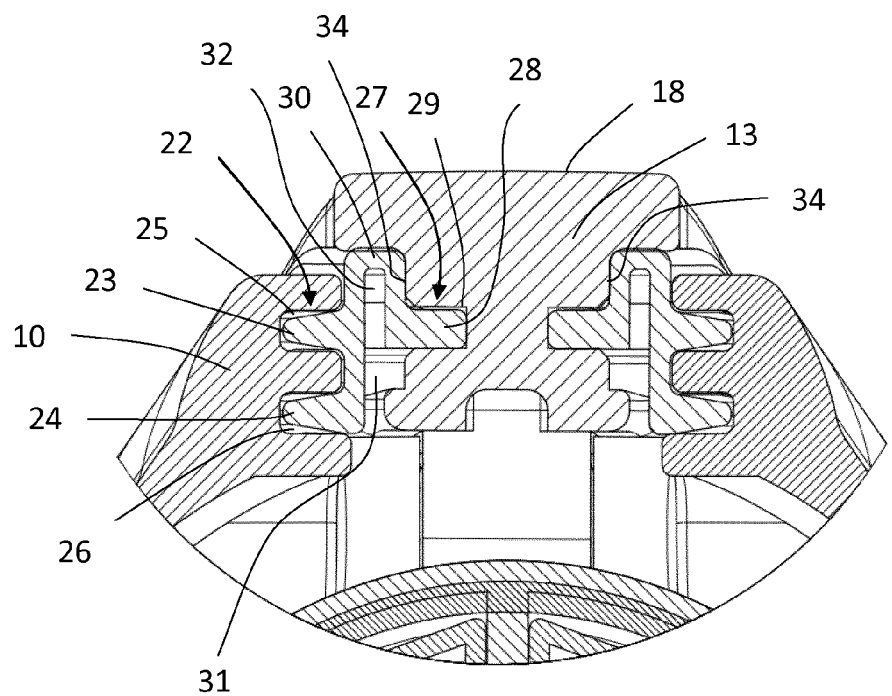
FIG. 4 is a schematic drawing of a detail of the plug shown in FIG. 1, in the form of a sectional drawing along the line A-A shown in FIG. 1.

A sealing element 17 is arranged between the locking element 13 and the housing 10, the sealing element 17 being arranged in a joining gap 31 between the locking element 13 and the housing 10, as is also shown in particular in FIG. 4. The sealing element 17 is not arranged in the region of the locking element 13, in particular the front end 15, that protrudes beyond the housing 10. The sealing element 17 merely extends over the regions of the locking element 13 that are arranged so as to be directly adjacent to or opposite the housing 10.

The sealing element 17 is made of an elastomeric material, in particular a rubber material.

Figure 2:
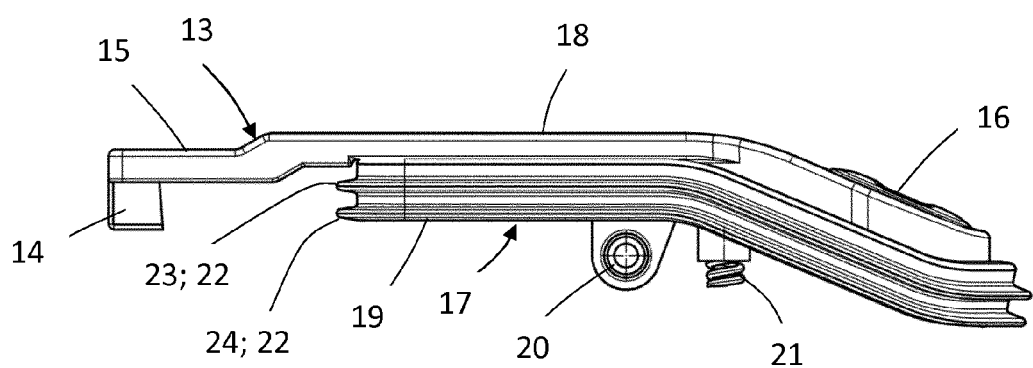
FIG. 2 is a schematic drawing of a locking element comprising a sealing element arranged thereon of a plug according to the invention as shown in FIG. 1.

FIG. 2 shows the locking element 13 along with the sealing element 17 arranged thereon. The sealing element 17 is arranged on the side faces 34, which are transverse to the upper face 18 and lower face 19 of the locking element 13 and are oriented directly opposite the housing 10, as can be seen in FIG. 4, in such a way that both the upper face 18 and the lower face 19 of the locking element 13 are exposed and not covered by the sealing element 17. The sealing element 17 thus does not extend over the entire length of the locking element 13, but merely over a partial region of the length of the locking element 13, the sealing element 17 being arranged where the locking element 13 is enclosed by the housing 10. The sealing element 17 is not arranged on the front end 15 of the locking element 13, on which the latch hook 14 is formed and which overlaps the plugging face 11 or plugging contour of the plug 100. The sealing element 17 thus extends over approximately three quarters of the length of the locking element 13.

A bearing axle 20 and a spring 21 are arranged on the lower face 19 of the locking element 13, both the bearing axle 20 and the spring 21 being arranged so as to be spaced apart from the sealing element 17, in such a way that any influence on the functionality of the bearing axle 20 and the spring 21 from the sealing element 17 can be prevented. By means of the bearing axle 20, the locking element 13 is pivotally mounted on the housing 10. The spring 21 makes it possible to mount the locking element 13 resiliently, in such a way that when the locking element 13 is actuated by applying pressure to the upper face 18 in the region of the rear end 16 of the locking element 13, the locking element 13 can be pivoted in such a way that the latch hook 14 can be latched onto a mating plug or released from the latching thereof. Applying a compressive force and pivoting the locking element 13 compresses the spring 21.

FIG. 2 further shows a fixing region 22 of the sealing element 17, referred to in the following as a second fixing region 22, by means of which the sealing element 22 can be fixed to the housing 10. The second fixing region 22 of the sealing element 17 is formed on the outer peripheral face of the sealing element 17, which points toward the housing 10. The second fixing region 22 here comprises a first ridge 23 and a second ridge 24 arranged below the first ridge 23, the first ridge 23 and the second ridge 24 each being formed in a receiving groove 25, 26 formed in the housing, said grooves likewise being arranged on top of or beneath one another, as is shown in particular in FIG. 4. As a result, a form-fitting connection between the sealing element 17 and the housing 10 can be formed. The ridges 23, 24 are each formed so as to be rib-shaped on the sealing element 17.

Figure 3:
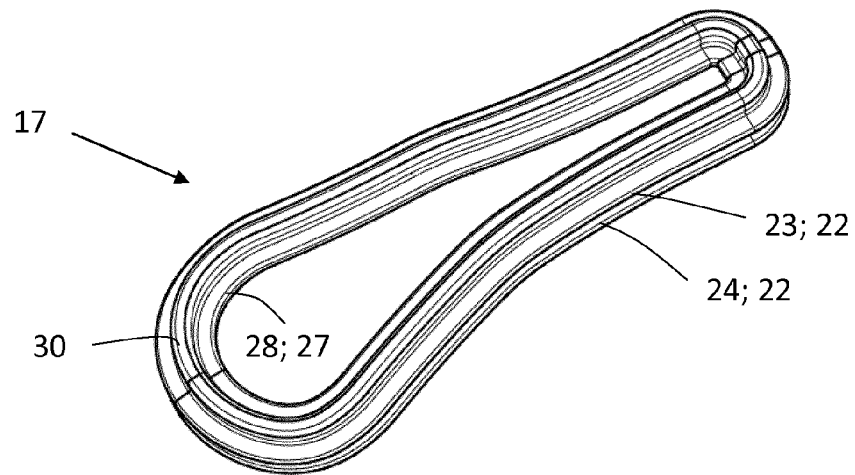
FIG. 3 is a schematic drawing of a sealing element as shown in FIGS. 1 and 2.

FIG. 3 shows the sealing element 17 by itself, it being discernible here that the sealing element 17 comprises a further first fixing region 27 on the inner peripheral face thereof, the first fixing region 27 likewise comprising a ridge 28 that can engage in a receiving groove 29 formed in the locking element 13, as is shown in FIG. 4. The ridge 28 or the first fixing region 27 is arranged peripherally on the inner peripheral face of the sealing element 17. The ridge 28 is formed so as to be rib-shaped on the sealing element 17.

As can be seen in FIG. 3, the first fixing region 27 is arranged opposite the second fixing region 22, by means of which the sealing element 17 can be fixed to the housing 10. The first ridge 28 of the first fixing region 27 is here arranged at the same height as the first ridge 23 of the second fixing region 22.

An elastically deformable connecting region 30 is formed between the first fixing region 27 and the second fixing region 22, and, as can be seen in FIG. 3, extends transversely relative to the ridges 23, 24, 28 of the fixing regions 27, 22. As can be seen in FIG. 4, the connecting region 30 has a U-shaped cross section, and therefore, as a result of the connecting region 30 that is U-shaped, the sealing element 17 can have a high degree of flexibility, in particular when the locking element 13 is pivoted, in such a way that during a pivot movement of the locking element 13 the first fixing region 27 can be pivoted upwards or downwards together with the locking element 13 and can thus be moved relative to the second fixing region 22, which is arranged in a fixed position on the housing 10. As a result of the U-shaped design of the connecting region 30 of the sealing element 17, a gap 32 is formed between the two fixing regions 27, 22, in such a way that there is no direct contact between the two fixing regions 27, 22.

So as to be able to achieve a peripheral sealing effect, the sealing element 17 is substantially oval, as can be seen in FIG. 3, the two ends of the sealing element 17 being integrally interconnected.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Plug 100
Housing 10
Plugging face 11
Cable 12
Locking element 13
Latch hook 14
Front end 15
Rear end 16
Sealing element 17
Upper face 18
Lower face 19
Bearing axle 20
Spring 21
Fixing region 22
Ridge 23
Ridge 24
Receiving groove 25
Receiving groove 26
Fixing region 27
Ridge 28
Receiving groove 29
Connecting region 30
Joining gap 31
Gap 32
Insertion opening 33
Side face 34

The invention claimed is:

1. A plug, comprising:
a housing;
a locking element that is pivotally mounted on the housing and by which the plug is configured to be fixed to a mating plug; and
a sealing element arranged between the locking element and the housing, the sealing element comprising a first fixing region configured to fix the sealing element to the locking element, a second fixing region configured to fix the sealing element to the housing, and, between the first fixing region and the second fixing region, an elastically deformable connecting region, by which the first fixing region is movable relative to the second fixing region during a pivot movement of the locking element.

2. The plug according to claim 1, wherein the connecting region of the sealing element is U-shaped.

3. The plug according to claim 1, wherein the first fixing region comprises at least one ridge that engages in a receiving groove formed in the locking element.

4. The plug according to claim 1, wherein the second fixing region comprises at least one ridge that engages in a receiving groove formed in the housing.

5. The plug according to claim 1, wherein the sealing element is arranged on the locking element so as to be spaced apart from a bearing axle formed on the locking element.

6. A plug, comprising:
a housing;
a locking element that is pivotally mounted on the housing and by which the plug is configured to be fixed to a mating plug; and
a sealing element arranged between the locking element and the housing, the sealing element comprising a first fixing region configured to fix the sealing element to the locking element, a second fixing region configured to fix the sealing element to the housing, and, between the first fixing region and the second fixing region, an elastically deformable connecting region, by which the first fixing region is movable relative to the second fixing region during a pivot movement of the locking element,
wherein the second fixing region comprises a first ridge and a second ridge arranged below the first ridge, the first ridge engaging in a first receiving groove formed in the housing and the second ridge engaging in a second receiving groove formed in the housing.

* * * * *